United States Patent Office 3,819,657
Patented June 25, 1974

3,819,657
METHYLATION OF TOCOPHEROLS
William S. Baldwin, Minneapolis, and Kenneth W. Keeney, St. Paul, Minn., assignors to General Mills Chemicals, Inc.
No Drawing. Filed Oct. 20, 1972, Ser. No. 299,482
Int. Cl. C07d 7/22
U.S. Cl. 260—345.5                                7 Claims

ABSTRACT OF THE DISCLOSURE

Tocopherols are converted to α-tocopherol using formaldehyde in the presence of an orthophosphoric acid catalyst with catalytic hydrogenation.

---

The present invention relates to a process for the conversion of tocopherols to alpha tocopherol.

As is well known, alpha tocopherol has high vitamin E activity, while non-alpha tocopherols such as beta, gamma and delta have much lower activity. The non-alpha tocopherols differ from the alpha form only in that one or both methyl groups are missing from the 5–7 positions. The predominant forms of tocopherol can be illustrated structurally as follows:

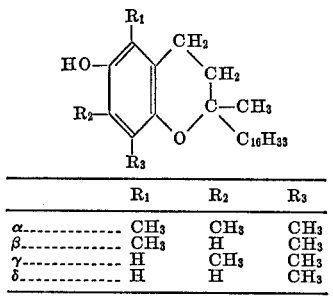

|   | $R_1$ | $R_2$ | $R_3$ |
|---|---|---|---|
| α | $CH_3$ | $CH_3$ | $CH_3$ |
| β | $CH_3$ | H | $CH_3$ |
| γ | H | $CH_3$ | $CH_3$ |
| δ | H | H | $CH_3$ |

The non-alpha tocopherols have been successfully converted to the alpha form by a number of procedures including chloromethylation and reduction using stannous chloride as the reducing agent. Stannous chloride is expensive, however, and thus it would be desirable to provide a commercially acceptable process at reduced cost.

We have now discovered that non-alpha tocopherols can be converted to the alpha form using formaldehyde in the presence of orthophosphoric acid (or an orthophosphoric acid generating material) and catalytic hydrogenation. Conversions of 90% and above have been achieved with our process.

Our process may be carried out with non-alpha tocopherols in various forms. Thus it may be carried out with pure non-alpha tocopherols or it may be carried out with impure mixtures of materials containing varying, even small, amounts of tocopherols. Thus prime starting materials are the products resulting from the refining of vegetable oils, for example, hot well sludge from the steam refining of vegetable oils. Soybean oil, corn oil, wheat germ oil, peanut oil, olive oil and the like are sources of such deodorizer sludge.

It is theorized that the formaldehyde in the presence of the orthophosphoric acid condenses with the non-alpha tocopherols to replace one or more of the hydrogens in the 5–7 positions on the benzene ring with hydroxy-methyl groups which are immediately converted to methyl groups by the catalytic hydrogenation. Accordingly, the formaldehyde will be used in an amount at least equivalent to the number of hydrogens on the benzene ring of the non-alpha tocopherols. Preferably, an excess of formaldehyde is used. It is also preferred to use paraformaldehyde as the source of the formaldehyde reactant.

The orthophosphoric acid is used in an amount sufficient to catalyze the condensation of the formaldehyde and non-alpha tocopherol reactants. In addition to orthophosphoric acid, $P_2O_5$ and polyphosphoric acids have given good results, the latter materials generating orthophosphoric acid in the reaction mixture. Preferably, the orthophosphoric acid will be used in amounts of about 15 to 45% by weight based on the non-alpha tocopherols in the crude material being treated.

It is also preferred that an organic solvent is used in our process. Especially good results have been realized with the use of methanol. Other representative solvents include isopropanol, toluene, acetone and the like. The quantity of solvent used is not critical although best results have been obtained with methanol at levels of 250 to 800% by weight based on the non-alpha tocopherols in the crude material being treated.

The hydrogenation is carried out with the use of a proper hydrogenation catalyst, such as a noble metal—i.e. palladium. The latter is preferably used in conjunction with charcoal.

Optimum results are achieved by charging all of the materials into a suitable reaction vessel, pressurizing the vessel with hydrogen and then heating the reaction mixture. It is preferred that the reaction mixture is heated to at least about 175° C. for a sufficient length of time to complete the condensation and hydrogenation. The temperature should not be so high as to cause decomposition of the reactants or products and is preferably held below about 300° C. The reactions are normally completed in less than about ten hours—i.e. from about 2 to 6 hours—at the indicated preferred temperatures. Preferred hydrogen pressures of about 500 to 2500 p.s.i.g. are used.

The following examples serve to further illustrate the invention without being limiting.

EXAMPLE I

To a steel lined autoclave was charged 78.8 g. of mixed tocopherol concentrate (obtained from soybean oil sludge—assaying 7.1% alpha, 33.6% gamma/beta and 14.6% delta tocopherols), 300 g. methanol and 2.8 g. 5% by wt. palladium on charcoal. One-half of a mixture of 18.6 g. paraformaldehyde and 8 g. $H_3PO_4$ (85% by weight aqueous solution) was also charged to the autoclave and the same was pressurized with hydrogen gas to 840 p.s.i.g. and heated to 200° C. for 45 minutes (gas pressure increased to 1260 p.s.i.g. at end of period). The reaction mixture was cooled to 50° C. and the remaining one-half of the paraformaldehyde-orthophosphoric acid solution was charged into the autoclave. The autoclave was again pressurized to 820 p.s.i.g. with hydrogen gas and heated at 200° C. for four hours (gas pressure was 1220–1280 throughout the heating period). The product was cooled, diluted with hexane, filtered, washed two times with water, dried and the hexane evaporated. The product analyzed 50.6% alpha tocopherol indicating a 92% conversion of non-alpha to alpha tocopherol.

EXAMPLE II

Example I was essentially repeated except the amount of methanol was reduced by one-half in relation to the other reactants (126 g. tocopherol concentrate, 240 g. methanol, 59.2 g. paraformaldehyde, 25.6 g. phosphoric acid and 4.5 g. catalyst). The product analyzed 50.6% alpha tocopherol. Thus the conversion was again 92%.

EXAMPLE III

Example II was essentially repeated except the amount of phosphoric acid catalyst was reduced by one-half in relation to the other reactants. An 84% conversion to α-tocopherol was achieved.

EXAMPLE IV

Example II was essentially repeated except that anhydrous $H_3PO_4$ was used as the catalyst. A 90% conversion to α-tocopherol was obtained.

EXAMPLE V

Example II was essentially repeated except the reaction temperature was reduced to 175° C. during the four hour reaction period. A 68.5% conversion to α-tocopherol was achieved.

EXAMPLE VI

Example II was essentially repeated except using 37% by weight aqueous formaldehyde in place of the paraformaldehyde and eliminating the methanol. A 50% conversion to α-tocopherol resulted.

EXAMPLE VII

Example II was essentially repeated except that the paraformaldehyde was reduced by 30% and all of the materials were initially charged to the autoclave. An 88.5% conversion to α-tocopherol was obtained.

EXAMPLE VIII

Example II was essentially repeated except that $P_2O_5$ (15.7 g.) was used in place of the orthophosphoric acid and all of the materials were initially charged to the autoclave. A 93.8% conversion to α-tocopherol was achieved.

EXAMPLE IX

Example II was essentially repeated except that all of the materials were initially charged to the autoclave and the hydrogen pressure was maintained between 400–500 p.s.i.g. A 90.2% conversion to α-tocopherol resulted.

EXAMPLE X

Example II was essentially repeated except that polyphosphoric acid (83% $P_2O_5$) was used in place of phosphoric acid. A conversion to α-tocopherol of 90.2% was obtained.

EXAMPLES XI–XIII

Example II was essentially repeated except using toluene, acetone and isopropanol as the solvents in place of the methanol (all materials initially charged to the autoclave). Conversions to α-tocopherol of 25.8, 30.1 and 71.1% respectively, were obtained.

EXAMPLE XIV

Example I was essentially repeated except: (1) all of the materials were charged initially to the autoclave; (2) no solvent was used (394 g. of tocopherol concentrate, 93 g. paraformaldehyde; 40.0 g. 85% $H_3PO_4$ and 14.0 g. 5% by wt. palladium on charcoal); and (3) the temperature was 175° C. for 2 hours at a hydrogen pressure of 1150 p.s.i.g. A 29.4% conversion to α-tocopherol was obtained.

The embodiments of the invention in which an exclusive property or privilege is claimed are defined as follows:

1. In a process for producing α-tocopherol from tocopherol selected from the group consisting of non-α-tocopherols having at least one hydrogen atom in the benzene nucleus comprising reacting the tocopherol with formaldehyde, the improvement comprising: carrying out said reaction at a temperature of at least about 175° C. in the presence of a catalytic amount of orthophosphoric acid or an orthophosphoric acid generating agent and subjecting the reaction mixture to catalytic hydrogenation.

2. In the process of claim 1 wherein the reaction is carried out in the presence of a solvent.

3. In the process of claim 2 wherein the solvent is methanol.

4. In the process of claim 1 wherein paraformaldehyde is used as the formaldehyde source.

5. In the process of claim 1 wherein the non-α-tocopherol starting material is a tocopherol concentrate containing β, γ, δ and α-tocopherols.

6. In the process of claim 1 wherein the catalytic hydrogenation is carried out using palladium as the catalyst.

7. The process of increasing the α-tocopherol content of a tocopherol concentrate containing α, β, γ and delta tocopherols which comprises reacting a methanol solution of the concentrate with paraformaldehyde at a temperature of at least about 175° C. in the presence of 15 to 45% by weight orthophosphoric acid based on the weight of the non-α-tocopherols and concurrently subjecting the reaction mixture to catalytic hydrogenation at a pressure of 500 to 2500 p.s.i.g. using palladium as the catalyst.

References Cited

UNITED STATES PATENTS 2,486,539  11/1949  Weisler _____ 260—345.5 X

JOHN M. FORD, Primary Examiner

U.S. Cl. X.R.

260—345.6